(12) United States Patent
Luo et al.

(10) Patent No.: US 11,134,397 B2
(45) Date of Patent: Sep. 28, 2021

(54) TECHNIQUES FOR SELECTING BACKHAUL NODES FOR CONNECTING TO AN INTEGRATED ACCESS AND BACKHAUL NETWORK

(71) Applicant: QUALCOMM Incorporated, San Diego, CA (US)

(72) Inventors: Jianghong Luo, Skillman, NJ (US); Navid Abedini, Somerset, NJ (US); Aria Hasanzadezonuzy, College Station, TX (US); Muhammad Nazmul Islam, Littleton, MA (US); Tao Luo, San Diego, CA (US); Junyi Li, Chester, NJ (US); Karl Georg Hampel, Hoboken, NJ (US); Piyush Gupta, Bridgewater, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/460,642

(22) Filed: Jul. 2, 2019

(65) Prior Publication Data
US 2020/0045563 A1 Feb. 6, 2020

Related U.S. Application Data

(60) Provisional application No. 62/713,333, filed on Aug. 1, 2018.

(51) Int. Cl.
*H04B 17/318* (2015.01)
*H04W 24/02* (2009.01)
(Continued)

(52) U.S. Cl.
CPC .......... *H04W 24/02* (2013.01); *H04B 17/318* (2015.01); *H04L 41/12* (2013.01); *H04W 52/262* (2013.01); *H04W 72/048* (2013.01)

(58) Field of Classification Search
CPC ... H04W 24/02; H04W 72/048; H04W 40/04; H04W 40/12
See application file for complete search history.

(56) References Cited

U.S. PATENT DOCUMENTS

| | | | |
|---|---|---|---|
| 10,292,095 B1* | 5/2019 | Park | H04W 48/20 |
| 2015/0109943 A1* | 4/2015 | Sahin | H04W 24/02 |
| | | | 370/252 |

(Continued)

OTHER PUBLICATIONS

Huawei et al., "IAB System Evaluation Methodology and Preliminary Results", 3GPP Draft; R1-1805924, 3rd Generation Partnership Project (3GPP), Mobile Competence Centre, 650, Route Des Lucioles, F-06921 Sophia-Antipolis Cedex, France, vol. RAN WG1, No. Busan, Korea; May 21, 2018-May 25, 2018 May 20, 2018, XP051441143, Retrieved from the Internet:URL:http://www.3gpp.org/ftp/Meetings%5F3GPP%5FSYNC/RAN1/Docs/ [retrieved on May 20, 2018], section 2.2, 9 pages.

(Continued)

*Primary Examiner* — Gary Mui
(74) *Attorney, Agent, or Firm* — Qualcomm Incorporated

(57) ABSTRACT

Aspects described herein relate to determining, based on a received signal strength, a set of potential backhaul nodes for providing a backhaul link in an integrated access and backhaul (IAB) network, determining, based at least in part on additional information regarding the set of potential backhaul nodes, at least one backhaul node of the set of potential backhaul nodes to which to connect over the backhaul link in the IAB network, and indicating, to an access node, the at least one backhaul node for attempting connection over the backhaul link.

36 Claims, 8 Drawing Sheets

(51) Int. Cl.
*H04L 12/24* (2006.01)
*H04W 52/26* (2009.01)
*H04W 72/04* (2009.01)

(56) References Cited

U.S. PATENT DOCUMENTS

| | | | | |
|---|---|---|---|---|
| 2017/0164260 | A1* | 6/2017 | Shi | H04W 36/0061 |
| 2018/0084480 | A1* | 3/2018 | Yasukawa | H04W 76/10 |
| 2018/0184436 | A1* | 6/2018 | Ohtsuji | H04B 7/2606 |
| 2019/0036595 | A1* | 1/2019 | Ohtsuji | H04W 76/14 |
| 2019/0104440 | A1* | 4/2019 | Yang | H04W 28/16 |
| 2019/0313269 | A1* | 10/2019 | Keskitalo | H04B 7/15542 |
| 2020/0008127 | A1* | 1/2020 | Ohtsuji | H04W 4/70 |
| 2020/0267602 | A1* | 8/2020 | Hashemi | H04W 88/14 |

OTHER PUBLICATIONS

Huawei: "Topology Discovery and Update for IAB", 3GPP Draft; R3-183821 Topology Discovery and Update for IAB, 3rd Generation Partnership Project (3GPP), Mobile Competence Centre, 650, Route Des Lucioles, F-06921. Sophia-Antipolis Cedex, France, vol. RAN WG3, No. Montreal, Canada; May 2, 2018-May 6, 2018 Jul. 1, 2018, XP051468105, Retrieved from the Internet: URL:http://www.3gpp.org/ftp/Meetings%5F3GPP%5FSYNC/RAN3/Docs/ [retrieved on Jul. 1, 2018], sections 2.1 and 2.2, 2 pages.

Huawei: "Topology Type, Discovery and update for IAB", 3GPP Draft; R3-183189 Topology Type, Discovery and update for IAB, 3rd Generation Partnership Project (3GPP), Mobile Competence Centre, 650, Route Des Lucioles, F-06921 Sophia-Antipolis Cedex, France, vol. RAN WG3, No. Busan , Korea; May 21, 2018-May 25, 2018 May 20, 2018, XP051445673, Retrieved from the Internet: URL:http://www.3gpp.org/ftp/Meetings%5F3GPP%5FSYNC/RAN3/Docs/ [retrieved on May 20, 2018] sections 3.1 and 3.2, 5 pages.

International Search Report and Written Opinion—PCT/US2019/040558—ISA/EPO—dated Oct. 9, 2019.

Nokia et al., "Measurements for IAB", 3GPP Draft; R2-1807723 Measurements for IAB, 3rd Generation Partnership Project (3GPP), Mobile Competence Centre, 650, Route Des Lucioles, F-06921 Sophia-Antipolis Cedex, France, vol. RAN WG2, No. Busan, South Korea; May 21, 2018-May 25, 2018 May 20, 2018, XP051444069, Retrieved from the Internet: URL:http://www.3gpp.org/ftp/Meetings%5F3GPP%5FSYNC/RAN2/Docs/ [retrieved on May 20, 2018], section 2.1 and 2.2, 5 pages.

Qualcomm Incorporated: "Evaluation Methodology for NR-IAB", 3GPP TSG RAN WG1, Meeting #93, R1-1807394, Busan, Korea, May 21-25, 2018, 3 Pages.

Qualcomm Incorporated: "Inter-IAB-Node Discovery", 3GPP Draft, 3GPP TSG RAN WG1 Meeting #93, R1-1807395, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018 May 12, 2018 (May 12, 2018), XP051463086, 8 Pages, Retrieved from the Internet: URL: http://www.3gpp.org/ftp/tsg%5Fran/WG1%5FRL1/TSGR1%5F93/Docs, [retrieved on May 12, 2018], paragraph [0003].

Qualcomm Incorporated: "Inter-IAB-Node Discovery", 3GPP TSG RAN WG2, Meeting #102, R2-1808009, Busan, South Korea, May 21-25, 2018, 7 Pages.

* cited by examiner

TECHNIQUES FOR SELECTING BACKHAUL NODES FOR CONNECTING TO AN INTEGRATED ACCESS AND BACKHAUL NETWORK

CLAIM OF PRIORITY UNDER 35 U.S.C. § 119

The present Application for Patent claims priority to Provisional Application No. 62/713,333, entitled "TECHNIQUES FOR SELECTING BACKHAUL NODES FOR CONNECTING TO AN INTEGRATED ACCESS AND BACKHAUL NETWORK" filed Aug. 1, 2018, which is assigned to the assignee hereof and hereby expressly incorporated by reference herein for all purposes.

BACKGROUND

Aspects of the present disclosure relate generally to wireless communication systems, and more particularly, to wireless communications using integrated access and backhaul (IAB) networks.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

As the demand for mobile broadband access continues to increase, however, further improvements in 5G communications technology and beyond may be desired. In an example, IAB networks, which may use 5G NR radio access technologies, include an access network between access nodes (ANs) and user equipment (UEs), and a backhaul network between ANs, where radio resources are shared between the access and backhaul networks. These networks are typically deployed in a topology based on location of AN cells with respect to one another and/or to a donor node that connects to a backend network. This deployment, however, may not always be optimal in a given radio communications environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications is provided that includes determining, based on a received signal strength, a set of potential backhaul nodes for providing a backhaul link in an integrated access and backhaul (IAB) network, determining, based at least in part on additional information regarding the set of potential backhaul nodes, at least one backhaul node of the set of potential backhaul nodes to which to connect over the backhaul link in the IAB network, and indicating, to an access node, the at least one backhaul node for attempting connection over the backhaul link.

In another example, an apparatus for wireless communication is provided that includes a transceiver, a memory configured to store instructions, and one or more processors communicatively coupled with the transceiver and the memory. The one or more processors are configured to determine, based on a received signal strength, a set of potential backhaul nodes for providing a backhaul link in an IAB network, determine, based at least in part on additional information regarding the set of potential backhaul nodes, at least one backhaul node of the set of potential backhaul nodes to which to connect over the backhaul link in the IAB network, and indicate the at least one backhaul node for attempting connection over the backhaul link.

In another example, an apparatus for wireless communication is provided that includes means for determining, based on a received signal strength, a set of potential backhaul nodes for providing a backhaul link in an IAB network, means for determining, based at least in part on additional information regarding the set of potential backhaul nodes, at least one backhaul node of the set of potential backhaul nodes to which to connect over the backhaul link in the IAB network, and means for indicating, to an access node, the at least one backhaul node for attempting connection over the backhaul link.

In another example, a non-transitory computer-readable medium including code executable by one or more processors for wireless communications is provided. The code includes code for determining, based on a received signal strength, a set of potential backhaul nodes for providing a backhaul link in an IAB network, determining, based at least in part on additional information regarding the set of potential backhaul nodes, at least one backhaul node of the set of potential backhaul nodes to which to connect over the backhaul link in the IAB network, and indicating, to an access node, the at least one backhaul node for attempting connection over the backhaul link.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
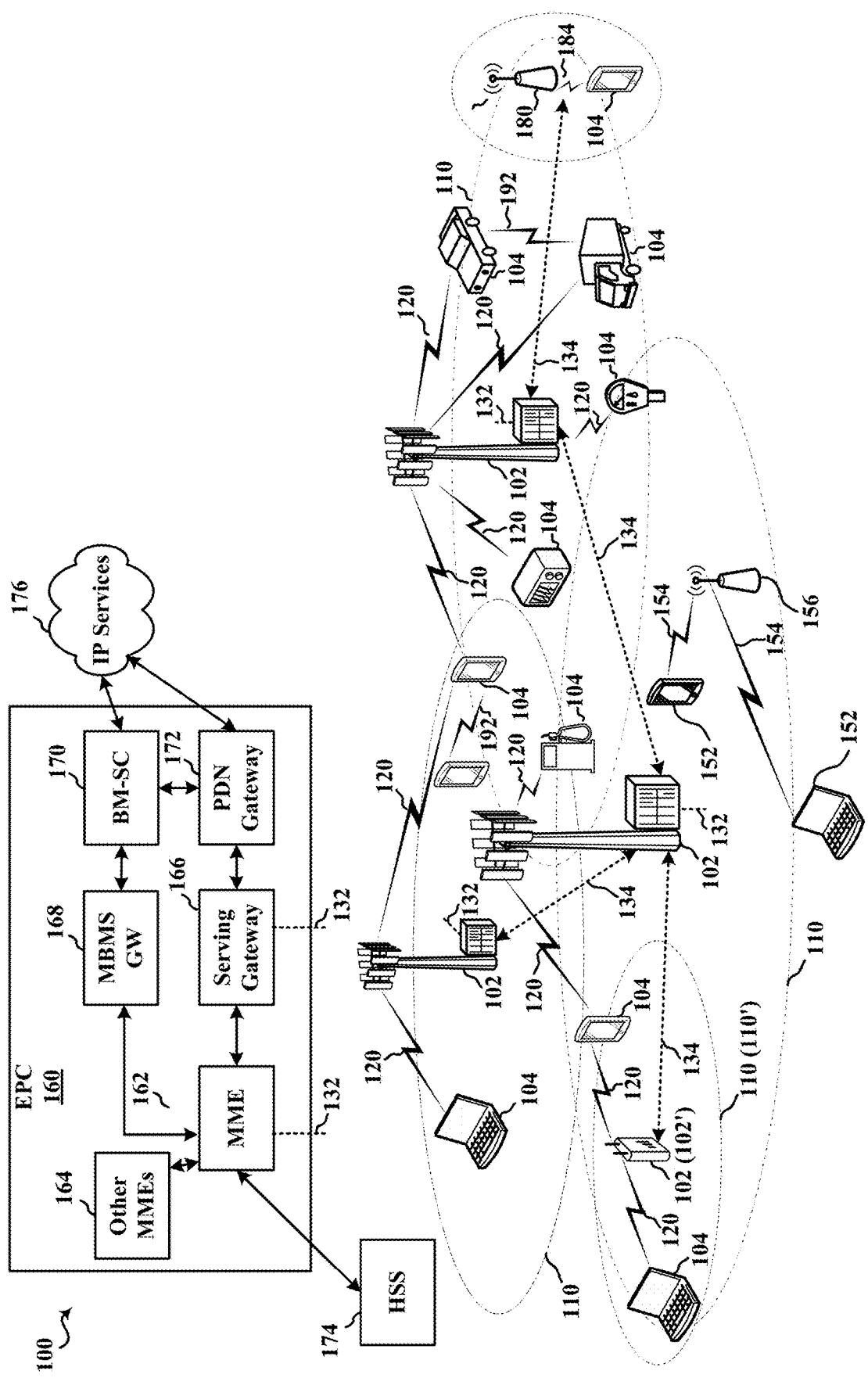
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring deployment of integrated access node (AN) and backhaul (IAB) networks based on received signal powers of (e.g. measured by) the corresponding ANs. In an example, an integrated access and backhaul (IAB) network can include one or more IAB-donor nodes that can terminate a Ng interface with a core network (e.g., which may include a wireline connection to the core network that terminates the Ng interface). The IAB network can also include one or more IAB-nodes that provide IAB functionality including an access node (AN) function (AN-F) for scheduling user equipment (UEs) and/or other IAB-nodes, and a UE function (UE-F) that is scheduled by a parent node (e.g., the IAB-donor and/or another upstream IAB-node). In this regard, the IAB-node can relay traffic to/from the IAB-donor node through one or more hops. The IAB network may also include one or more UEs connected to one or more of the IAB-nodes or IAB-donor nodes. In an example, the IAB network topology or deployment can be configured to determine connections between IAB-nodes and its route from/to an IAB-donor node to establish the IAB network. The topology can impact the network in user perceived throughput (UPT), latency, resource allocation scheme performance, routing and scheduling performance, and/or the like based on a number of hops from a given IAB-node to the IAB-donor, received signal strength or capability information for each hop or related IAB-node, etc.

Aspects described herein relate to configuring deployment of the IAB network based at least in part on selecting, for a given IAB-node, an upstream backhaul node (e.g., another IAB-node or the IAB-donor) based on parameters such as received signal strength at the given IAB-node, one or more observed parameters, capabilities, or other metrics of the upstream backhaul node, etc. For example, a set of potential backhaul nodes (also referred to as candidate backhaul nodes) for connecting via an AN (e.g., an IAB-node that provides an AN-F) can be determined based on received signal strength (e.g., where the received signal strength achieves a threshold, is within a range, and/or the like). In addition, for example, one or more backhaul nodes in the set of potential backhaul nodes can be selected for connection based on additional information regarding the one or more backhaul nodes. The additional information may relate to one or more capabilities and/or other metrics of the one or more backhaul nodes. The AN can then attempt connection (e.g., using a UE-F of the IAB-node) to the one or more backhaul nodes to access the IAB network. For example, the AN can determine the one or more backhaul nodes and/or can receive an indication of the one or more backhaul nodes from a centralized entity. In this example, using the signal strength and additional information of the backhaul nodes to select a backhaul link can allow for establishing an IAB network deployment with desirable access link quality at each AN.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring to FIG. 1, in accordance with various aspects described herein, an example of a wireless communication access network 100 is depicted. The wireless communication access network 100 can include one or more UEs 104 and/or one or more base stations 102 that may communicate with other UEs and/or other base stations via an Evolved Packet Core (EPC) 160 or a 5G core. The base stations 102 (which can be collectively referred to as Evolved Universal Mobile Telecommunications System (UMTS) Terrestrial Radio Access Network (E-UTRAN)) may interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x can be a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 156 in communication with Wi-Fi stations (STAs) 152 via communication links 154 in a 5 GHz unlicensed frequency spectrum. When communicating in an unlicensed frequency spectrum, the STAs 152/AP 156 may perform a clear channel assessment (CCA) prior to communicating in order to determine whether the channel is available. In one example, aspects described herein in the context of a base station 102 may be employed, where appropriate, by an AP 156. Similarly, for example, aspects described herein in the context of a UE 104 may be employed, where appropriate, by a STA 152.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 156. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 can be a control node that processes signaling between the UEs 104 and the EPC 160. Generally, the MME 162 can provide bearer and connection management. User Internet protocol (IP) packets (e.g., of or relating to the UE 104) can be transferred through the Serving Gateway 166, which itself is connected to the PDN Gateway 172. The PDN Gateway 172 can provide UE IP address allocation as well as other functions. The PDN Gateway 172 and the BM-SC 170 can be connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information. In other examples, a 5G core may include other components or functions that may be accessible by the base station 102 over a backhaul link in a 5G wireless network, such as a Access and Mobility Management Function (AMF) a Session Management Function (SMF), a User Plane Function (UPF), a Unified Data Management (UDM), etc.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for one or more UEs 104. Examples of UEs 104 include factory equipment or nodes, as described above, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

As described in examples herein, wireless communication access network 100 can provide a framework for an IAB network. In an example, the IAB network can include an access network between ANs and UEs, and a backhaul network between ANs. The IAB network can generally include anchor nodes including ANs with a wireline or other connection to a network (e.g., to an EPC or 5G core, referred to herein as core network), and one or more relay nodes that relay traffic from/to the anchor nodes via one or more hops. An IAB network may use a similar framework as the wireless communication access network 100, where a base station 105 may be an anchor node to the core network, and a UE 104 may be a UE or a relay node to relay traffic from the anchor node to other UEs. In this example, a UE 104 that functions as a relay node (also referred to herein as an IAB-node) can include 1) a AN-F for communicating with one or more UEs or downstream relay nodes (e.g., by transmitting over a downlink and receiving over an uplink), and 2) a UE-F for communicating with an anchor node and/or one or more upstream relay nodes (e.g., by transmitting over an uplink and receiving over a downlink). As described, an IAB network can share resources between access and backhaul, and may operate using a LTE radio access technology, 5G NR radio access technology, and/or the like.

Figure 2:
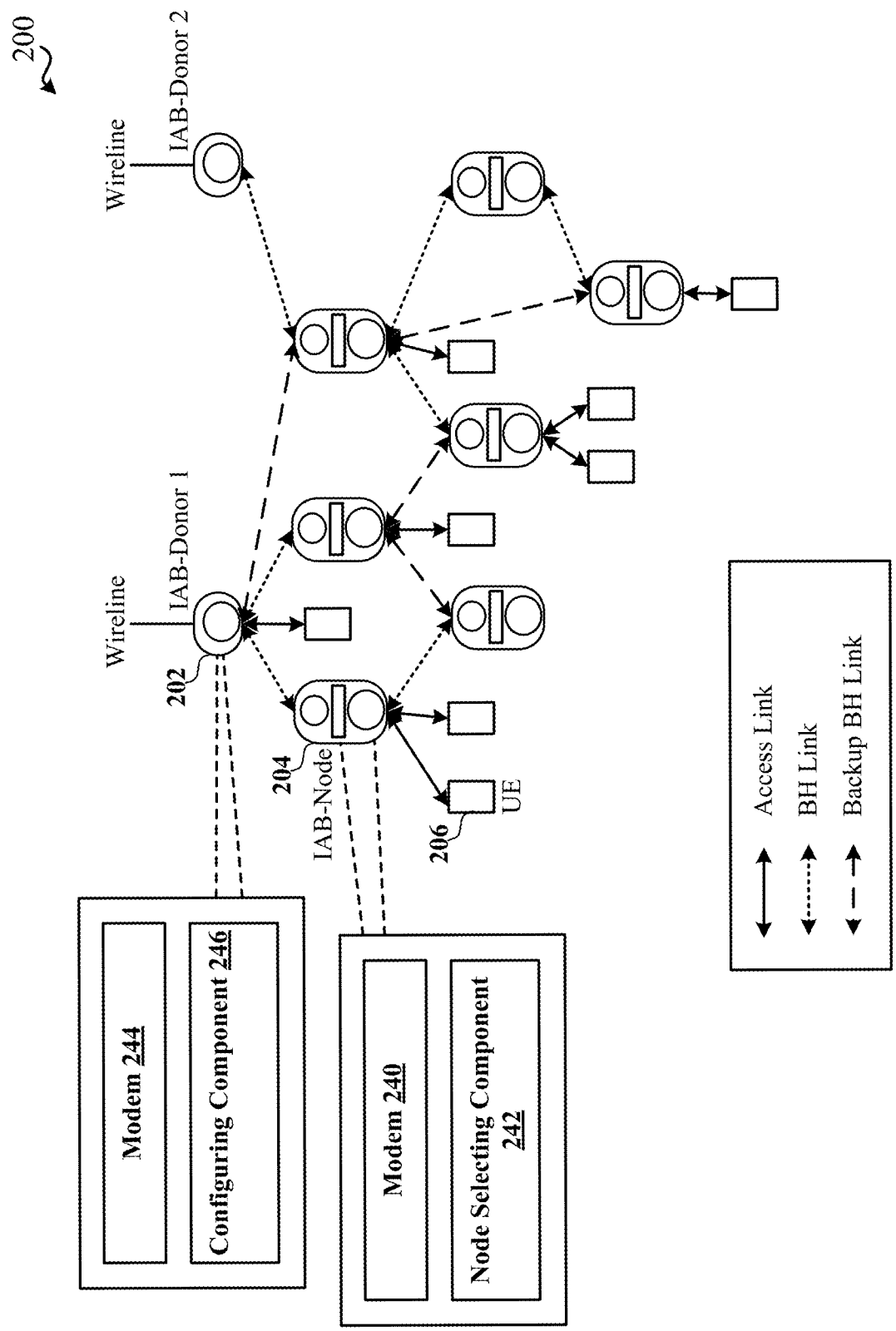
FIG. 2 illustrates an example of a wireless communication system that provides an integrated access and backhaul (IAB) network, in accordance with various aspects of the present disclosure.

Referring to FIG. 2, in accordance with various aspects described herein, an example of another wireless communication access network 200 that can provide an IAB network is depicted. The wireless communication access network 200 can include one or more IAB-donor nodes 202, which may be anchor nodes, one or more IAB-nodes 204, which may be relay nodes, and one or more UEs 206. The IAB-donor nodes 202 can include a wireline connection to a network and may terminate a Ng interface. The IAB-nodes 204 can provide the AN-F and the UE-F, as described. In this regard, the IAB-nodes 204 can communicate with the IAB-donor node 202 or other upstream IAB-nodes using the UE-F, which is controlled and scheduled by the IAB-donor node 202 or other upstream IAB-node 204 connected as parent nodes, and uses a backhaul link. The IAB-nodes 204 can also communicate with one or more UEs 206 or other downstream IAB-nodes 204 using the AN-F, which schedules the UEs 206 and/or other downstream IAB-nodes 204 connected as child nodes, and controls both access links and backhaul links under its coverage.

Network topology management can be used to determine connections between IAB-nodes and routes from/to an IAB-donor, as described. In aspects described herein, network topology can be determined based on signal strength between ANs. For example, a first AN can determine a received signal strength (and/or capabilities or other metrics, as described further herein) of a second AN, and can accordingly determine to connect to the second AN to receive backhaul access to the wireless network (e.g., via one or more additional IAB-nodes that connect to an IAB-donor).

Figure 3:
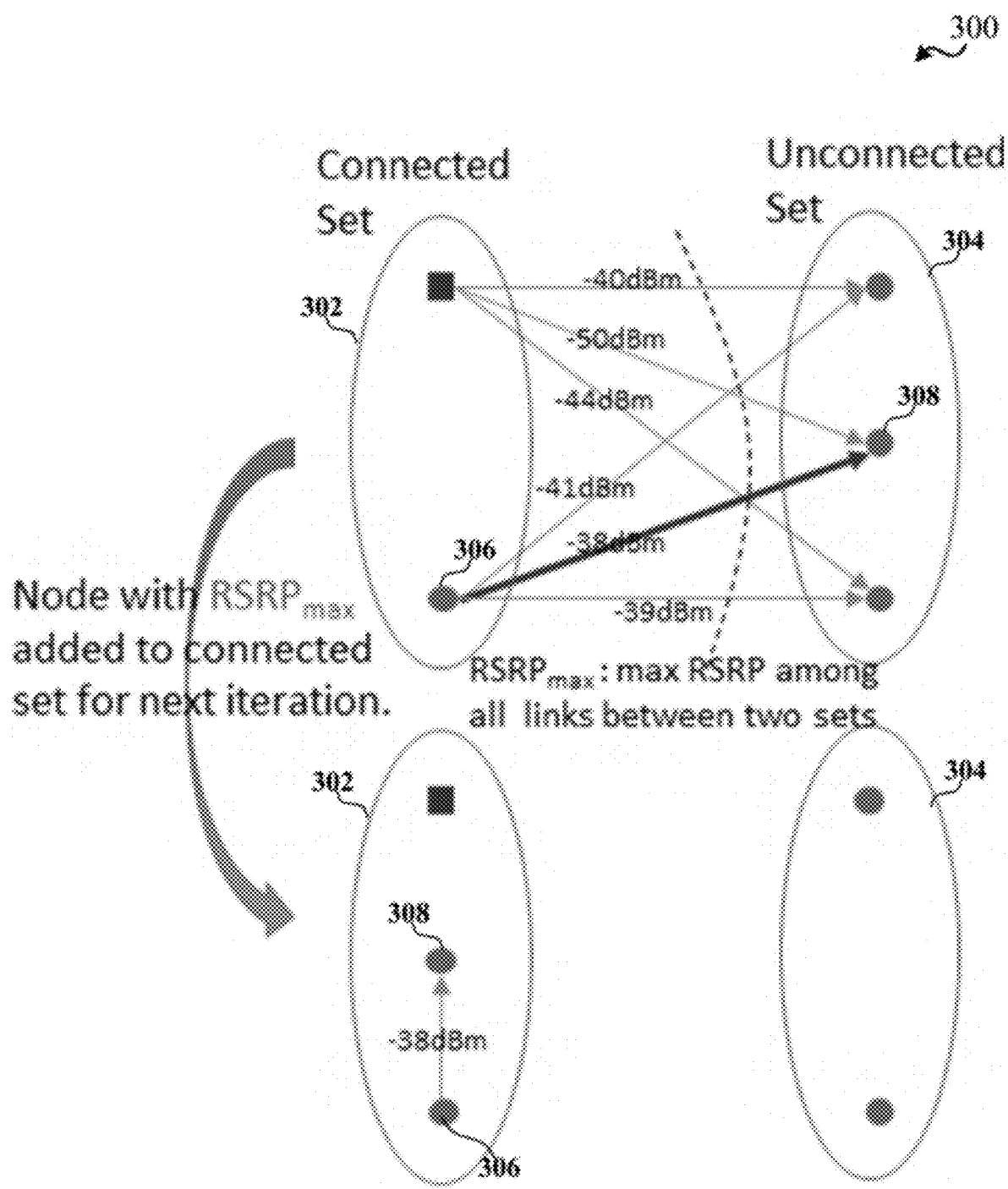
FIG. 3 illustrates an example of a wireless communication system with connected and unconnected nodes in an IAB network, in accordance with various aspects of the present disclosure.

Referring to FIG. 3, in accordance with various aspects described herein, an example of another wireless communication access network 300 that is deployed based on signal strength is depicted. The wireless communication access network 300 can include multiple nodes (e.g., IAB-nodes) that may be part of a connected set 302 or an unconnected set 304. The nodes in the unconnected set 304 can attempt to find other nodes in the connected set 302 having a signal strength achieving a threshold, and can attempt connection to such nodes for a backhaul link to the IAB network. For example, node 308 can be part of unconnected set 304, and can detect a received signal strength from node 306 as achieving a threshold (e.g., received signal strength >−39 decibel milliwatts (dBm)). Based on this detection, for example, node 306 can attempt connection to node 208 to access the IAB network, and become part of the connected set 302, as shown.

In an example, the received signal strength can be measured as a reference signal received power (RSRP) where an AN (e.g., node 306) measures the power of a received reference signal from another node (e.g., node 308). This can be referred to as an RSRP-based tree topology and can be considered as a baseline for determining topology. In this example, the RSRP of the candidate nodes for providing a backhaul link can be measured by a given IAB-node, where the candidate nodes can also be IAB-nodes and/or a IAB-donor. Each IAB-node can, for example, connect to its strongest candidate backhaul link (e.g., to a node having a highest measured RSRP that is also capable of providing a backhaul link, or in other words, is part of the connected set). An example "centralized" scheme to create such topology can be as follows: initialize a connected set 302 with only IAB-donor nodes and an unconnected set 304 as all other IAB-nodes; and start an iterative procedure by selecting one node from the unconnected set 304 and moving it to the connected set 302 until all nodes are at connected set 302. The iterative process can include determining the measured RSRPs between each node from connected set 302 to any node in unconnected set 304; identifying the node pair with highest RSRP and establish the link; moving the associated unconnected node to the connected set 302 together with the established link. In this example, topology management can include initial integration of a new IAB-node, and reselection of the parent node (as its scheduling node) for an IAB-node. Using only RSRP, for example, may cause some IAB-nodes to have large hop counts to an IAB-donor, which may decrease rate capacity of the network and/or yield to larger latency. Adding more IAB-donor nodes may result in some IAB-donor nodes being underutilized. Thus, as described herein, additional information can be used, in addition or alternative to RSRP or other signal strength measurements, to determine an IAB-node (or IAB-donor node) to use as a backhaul connection for a given IAB-node.

Figure 5:
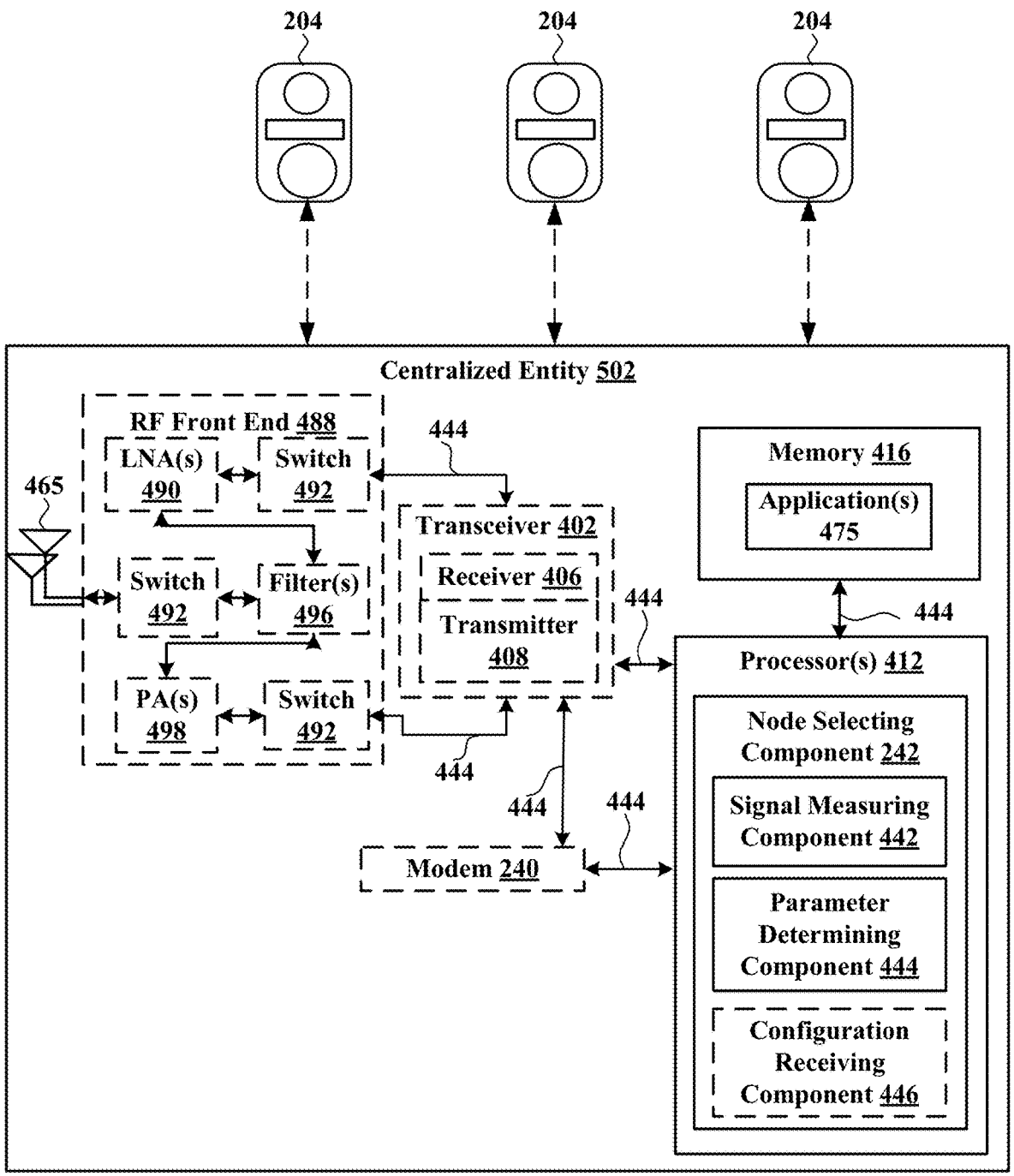
FIG. 5 is a block diagram illustrating an example of a centralized entity, in accordance with various aspects of the present disclosure.
Figure 6:
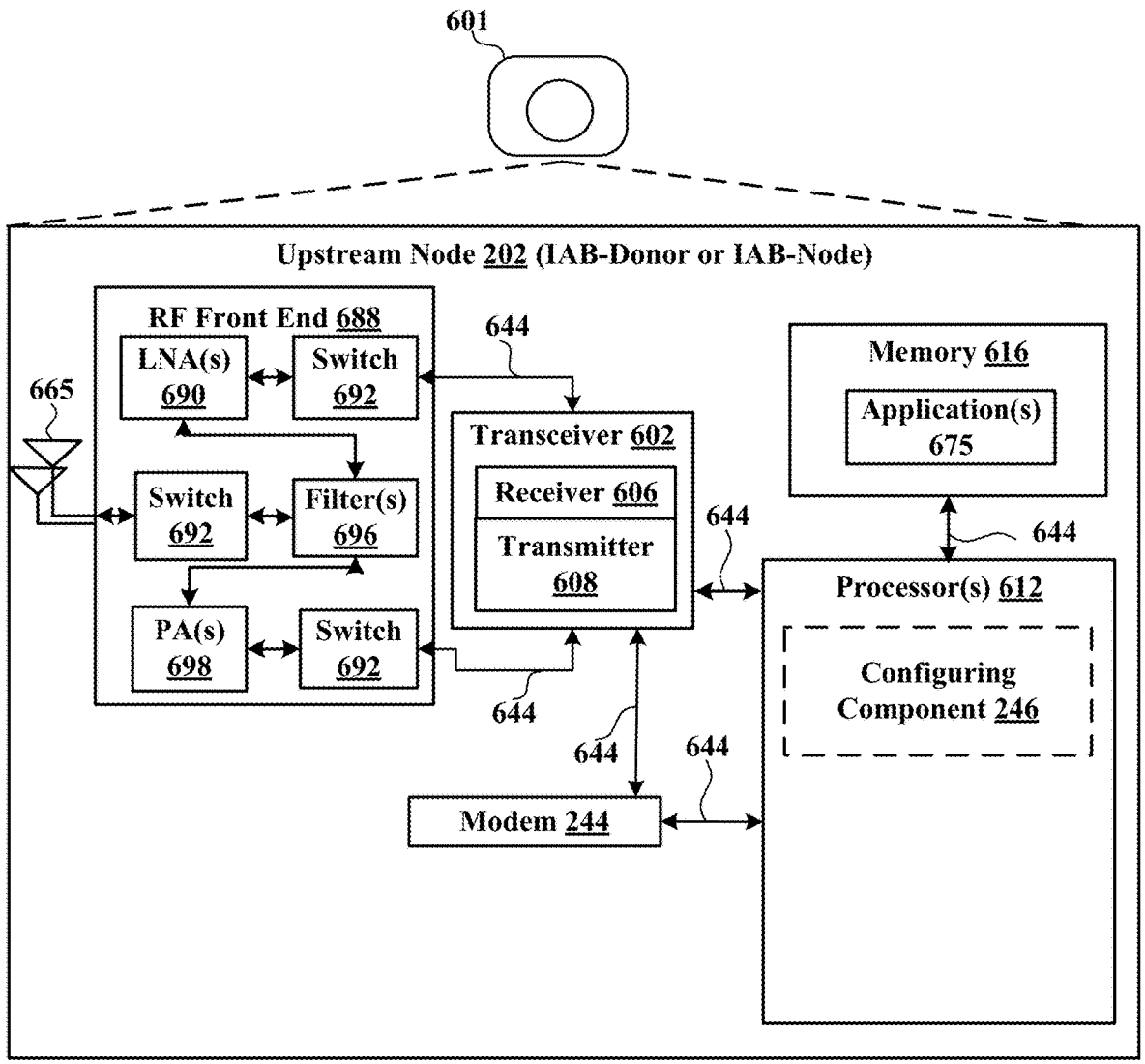
FIG. 6 is a block diagram illustrating an example of an upstream node, in accordance with various aspects of the present disclosure.
Figure 7:
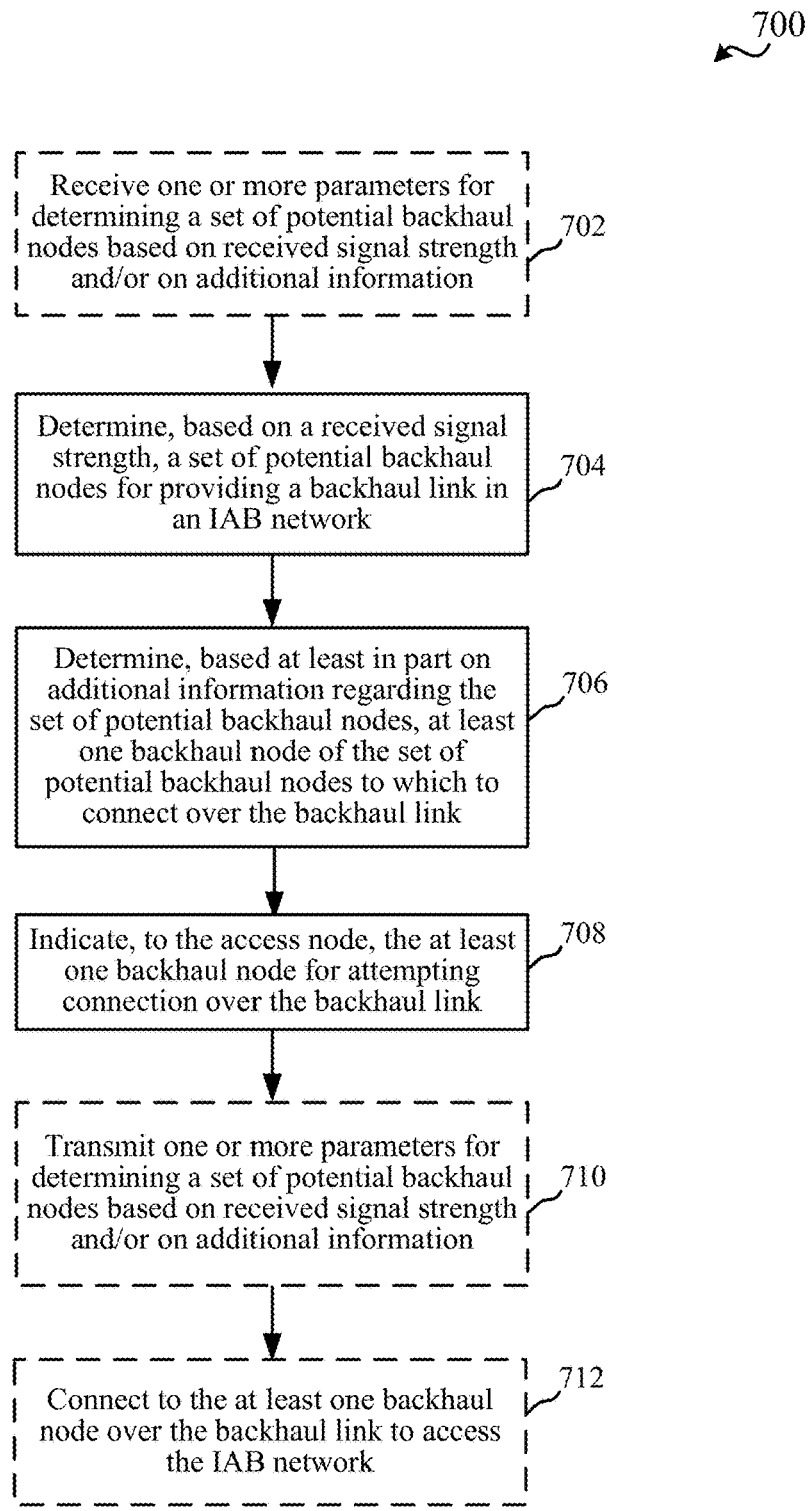
FIG. 7 is a flow chart illustrating an example of a method for selecting backhaul nodes for accessing an IAB network, in accordance with various aspects of the present disclosure.

Turning now to FIGS. 4-8, aspects are depicted with reference to one or more components and one or more methods that may perform the actions or operations described herein, where aspects in dashed line may be optional. Although the operations described below in FIG. 7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 4:
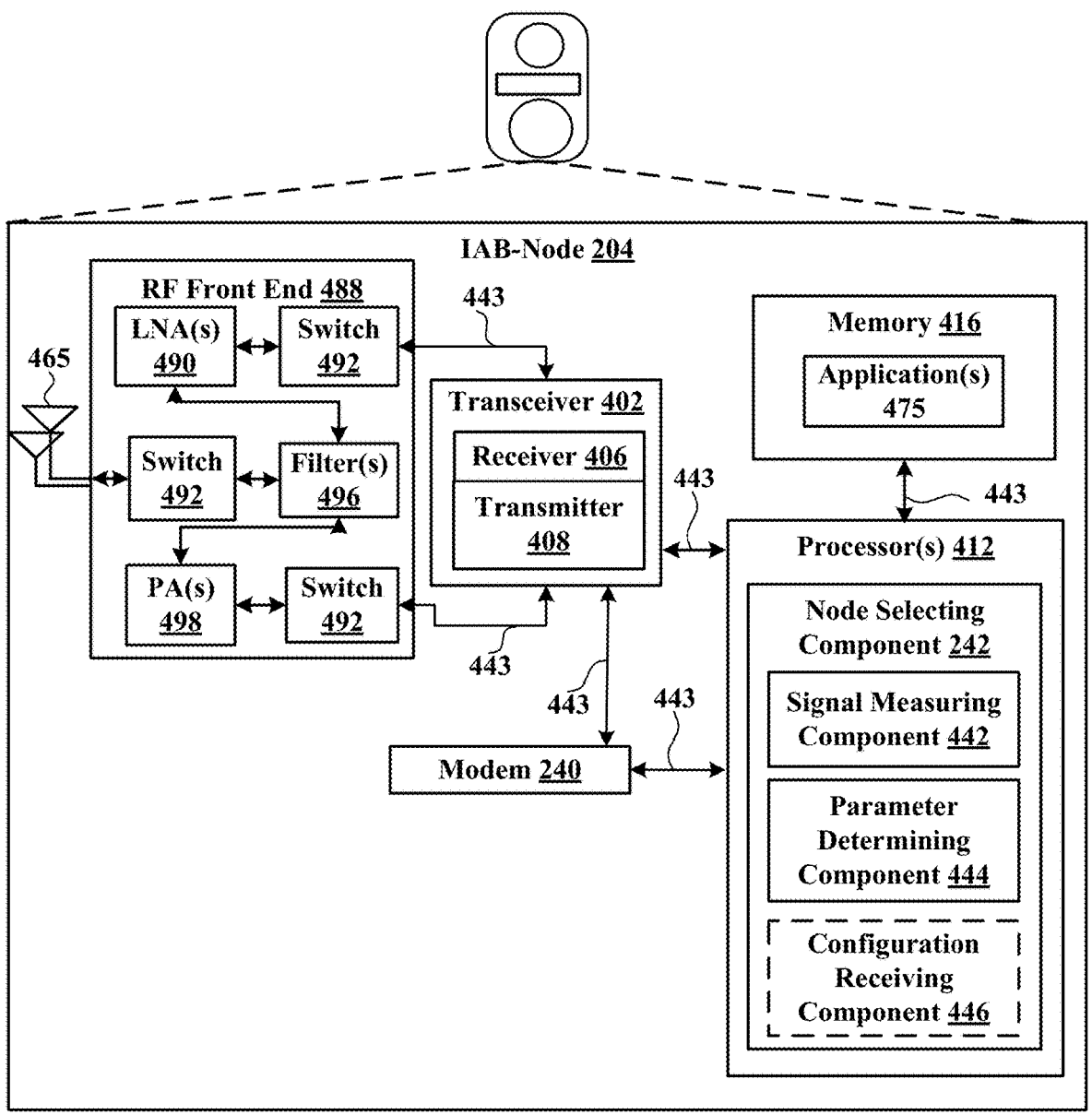
FIG. 4 is a block diagram illustrating an example of an IAB-node, in accordance with various aspects of the present disclosure.

Referring to FIG. 4, one example of an implementation of a IAB-node 204 may include a variety of components, some of which have already been described above and are described further herein, including components such as one or more processors 412 and memory 416 and transceiver 402 in communication via one or more buses 443, which may operate in conjunction with modem 240 and/or a node selecting component 242 to enable selecting one or more backhaul nodes for backhaul access to an IAB network. For example, node selecting component 242 can include a signal measuring component 442 configured for measuring a received signal strength of one or more backhaul nodes, a parameter determining component 444 configured for determining additional information related to the one or more backhaul nodes, and/or an optional configuration receiving component 446 for obtaining a configuration specifying one or more parameters related to selecting one or more of the backhaul nodes based on received signal strength and/or the additional information.

In an aspect, the one or more processors 412 can include a modem 240 and/or can be part of the modem 240 that uses one or more modem processors. Thus, the various functions related to node selecting component 242 may be included in modem 240 and/or processors 412 and, in an aspect, can be executed by a single processor, while in other aspects, different ones of the functions may be executed by a combination of two or more different processors. For example, in an aspect, the one or more processors 412 may include any one or any combination of a modem processor, or a baseband processor, or a digital signal processor, or a transmit processor, or a receiver processor, or a transceiver processor associated with transceiver 402. In other aspects, some of the features of the one or more processors 412 and/or modem 240 associated with node selecting component 242 may be performed by transceiver 402.

Also, memory 416 may be configured to store data used herein and/or local versions of applications 475 or node selecting component 242 and/or one or more of its subcomponents being executed by at least one processor 412. Memory 416 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, memory 416 may be a non-transitory computer-readable storage medium that stores one or more computer-executable codes defining node selecting component 242 and/or one or more of its subcomponents, and/or data associated therewith, when IAB-node 204 is operating at least one processor 412 to execute node selecting component 242 and/or one or more of its subcomponents.

Transceiver 402 may include at least one receiver 406 and at least one transmitter 408. Receiver 406 may include hardware, firmware, and/or software code executable by a processor for receiving data, the code comprising instructions and being stored in a memory (e.g., computer-readable medium). Receiver 406 may be, for example, a radio frequency (RF) receiver. In an aspect, receiver 406 may receive signals transmitted by an upstream node, a downstream node, etc. Additionally, receiver 406 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 408 may including, but is not limited to, an RF transmitter.

Moreover, in an aspect, IAB-node 204 may include RF front end 488, which may operate in communication with one or more antennas 465 and transceiver 402 for receiving and transmitting radio transmissions, for example, wireless communications transmitted by at least one base station 102 or wireless transmissions transmitted by IAB-node 204. RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 488 may use one or more switches 492 to select a particular LNA 490 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 488 may use one or more switches 492 to select a particular PA 498 and its specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 496, LNA 490, and/or PA 498, based on a configuration as specified by transceiver 402 and/or processor 412.

As such, transceiver 402 may be configured to transmit and receive wireless signals through one or more antennas 465 via RF front end 488. In an aspect, transceiver 402 may be tuned to operate at specified frequencies such that IAB-node 204 can communicate with, for example, one or more upstream nodes or one or more cells associated with one or more upstream nodes, one or more DUs, etc. In an aspect, for example, modem 240 can configure transceiver 402 to operate at a specified frequency and power level based on a configuration of the IAB-node 204 and the communication protocol used by modem 240.

In an aspect, modem 240 can be a multiband-multimode modem, which can process digital data and communicate with transceiver 402 such that the digital data is sent and received using transceiver 402. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of IAB-node 204 (e.g., RF front end 488, transceiver 402) to enable transmission and/or reception of signals from the network based on a specified modem configuration. In an aspect, the modem configuration can be based on the mode of the modem and the frequency band in use. In another aspect, the modem configuration can be based on configuration information associated with IAB-node 204 as provided by the network during cell selection and/or cell reselection or initial access.

In an aspect, the processor(s) 412 may correspond to one or more of the processors described in connection with the base station and/or UE in FIG. 8 to provide an AN-F or UE-F, as described. Similarly, the memory 416 may correspond to the memory described in connection with the base station and/or UE in FIG. 8 to provide an AN-F or UE-F, as described.

Referring to FIG. 5, one example of an implementation of a centralized entity 502 may include a variety of components, some of which have already been described above and are described further herein. For example, centralized entity 502 may include a processor 412 that implements a node selecting component 242, as described in reference to FIG. 4, and may select a backhaul node for one or more IAB-nodes 204. In this regard, centralized entity 502 may optionally include similar components as IAB-node 204 described in FIG. 4, such as a transceiver 402, modem 240, RF front end 488, antennas 465, etc. for receiving signals from the IAB-nodes 204 indicating signal measurements and/or for transmitting an indication of a selected backhaul node to the IAB-nodes 204 to facilitate selection thereof based on received signal strength and/or additional parameters regarding the selected backhaul nodes. In one example, the centralized entity 502 may be or may include a IAB-node 204, an IAB-donor 202, or other device with which the IAB-nodes 204 can communicate. In another example, the centralized entity 502 may be coupled to the IAB-nodes 204 using a hardwire or other medium, and thus may not require some components of the IAB-node 204 described in FIG. 4. In this regard, some or all of the described functions of the node selecting component 242 may be present in, or provided by, the IAB-node 204 selecting the one or more backhaul nodes or a centralized entity 502.

Referring to FIG. 6, one example of an implementation of an upstream node 601 (which may be an IAB-donor node 202 or one or more upstream IAB-nodes 204 serving as aa backhaul node for one or more downstream IAB-nodes 204) may include a variety of components, some of which have already been described above, but including components such as one or more processors 612 and memory 616 and transceiver 602 in communication via one or more buses 644, which may operate in conjunction with modem 244 to provide backhaul access to an IAB network. In addition, the one or more processors 612 and memory 616 and transceiver 602 etc. may optionally operate with a configuring component 246 for configuring parameters to allow for selecting a backhaul node for an IAB-node 204 to attempt connection with to access the IAB network.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of IAB-node 204, as described above, but configured or otherwise programmed for upstream node or backhaul node operations as opposed to downstream IAB-node operations.

In an aspect, the processor(s) 612 may correspond to one or more of the processors described in connection with the base station in FIG. 8 to provide an AN-F, as described. Similarly, the memory 616 may correspond to the memory described in connection with the base station in FIG. 8 to provide an AN-F, as described.

FIG. 7 illustrates a flow chart of an example of a method 700 for determining and selecting one or more backhaul nodes with which to establish a connection to access an IAB network. In an example, an IAB-node 204 or a centralized entity 502 can perform one or more of the functions described in method 700 using one or more of the components described in FIGS. 4-5 (and in some examples, an IAB-node 204 can perform some functions while a centralized entity 502 can perform other functions). In examples, the method 700 can be performed by a gNB, IAB child node, IAB node with UE-F, etc. Moreover, for example, the IAB-node 204 and/or centralized entity 502 can perform the functions described in method 700 as part of an initial integration of the IAB-node to the IAB network and/or as part of a reselection of the IAB-node 204 to reselect a node for its backhaul link.

In method 700, optionally at Block 702, one or more parameters for determining a set of potential backhaul nodes based on received signal strength and/or on additional information can be received. In an aspect, configuration receiving component 446, e.g., in conjunction with processor(s) 412, memory 416, transceiver 402, node selecting component 242, etc., can receive the one or more parameters for determining the set of potential backhaul nodes based on received signal strength and/or additional information. For example, configuration receiving component 446 can receive the one or more parameters in a configuration (e.g., from another IAB-node 204, IAB-donor 202, centralized entity 502 or other node), which can be by way of a remaining minimum system information (RMSI) message or other system information (OSI) message in broadcast signaling, radio resource control (RRC) message, other backhaul (BH) signaling, etc. In addition, the configuration may indicate the one or more parameters, including a threshold signal strength or range of signal strength for determining potential backhaul nodes, an indication related to capabilities of backhaul nodes (e.g., capability values that should be considered in selecting a backhaul node), etc., as described further herein. In this regard, node selecting component 242 can be configured to select a backhaul node, as described further herein, based on thresholds, capabilities, etc. configured at the IAB-node 204 or otherwise received in a configuration from another node.

In this regard, for example, the upstream node 202 (e.g., IAB-donor or IAB-node) described in FIG. 6 may, via configuring component 246, configure one or more IAB-nodes 204 with the parameters or capability information for selecting the backhaul node. For example, the upstream node 202 can transmit the configuration (e.g., in RMSI, OSI, RRC message, other BH signaling, etc.) to the IAB-node 204, and the IAB-node 204 can perform a selection process, as described herein, based at least in part on one or more parameters specified in the configuration. For example, the IAB-node 204 may use the indicated parameters for determining the set of potential backhaul nodes and/or selecting the at least one backhaul node (e.g. in a distributed scheme), as described below. In another example, the IAB-node 204 may use the indicated parameters for determining its measurement report—e.g. which detected backhaul nodes to report (along with its measurement) to another node (e.g., an upstream node, centralized entity 502, etc.) in a centralized scheme. In yet another example, the IAB-node 204 may report its measured RSRPmax and/or capability information, as described further herein, to another node for link selection.

In method 700, at Block 704, a set of potential backhaul nodes for providing a backhaul link in an IAB network can be determined based on a received signal strength. In an aspect, signal measuring component 442, e.g., in conjunction with processor(s) 412, memory 416, transceiver 402, node selecting component 242, etc., can determine, based on the received signal strength, the set of potential backhaul nodes for providing the backhaul link in the IAB network. For example, signal measuring component 442 can determine a received signal strength of various backhaul nodes, and can compare the received signal strength to one or more values, such as a threshold signal strength, a range of signal strengths, etc. to determine whether a given backhaul node is a potential backhaul node to include in a set of potential backhaul nodes for providing a backhaul link to the IAB-node 204. In an example, signal measuring component 442 can receive and measure a reference signal received from the various backhaul nodes, where the reference signal may include a primary synchronization signal (PSS), secondary synchronization signal (SSS), common reference signal (CRS), channel state information reference signal (CSI-RS), and/or substantially any type of reference signal or broadcast signal transmitted by the various backhaul nodes. As described, signal measuring component 442 can measure a RSRP and/or RSRQ of reference signals, RSSI of substantially any signal, and/or the like.

In an example, signal measuring component 442 can determine that a backhaul node is a potential backhaul node for providing a backhaul link (e.g., can determine to include the backhaul node in a set of potential backhaul nodes) based on whether its measured RSRP (e.g., as measured by or at the IAB-node 204) achieves a threshold and/or is within an interval (e.g., [RSRP1, RSRP2]). Thresholds RSRP1 and RSRP2 may be determined, and/or may otherwise depend, on factors such as a maximum RSRP (RSRPmax), a set of supported modulation and coding scheme (MCS) values, a number of supported multiple-input multiple-output (MIMO) layers, a maximum supported bandwidth (BW), a maximum transmission (TX) power, etc. Thus, in one example, signal measuring component 442 may determine one or more of the thresholds based on determining a configured RSRPmax. The configured RSRPmax can include IAB-node 204 determining RSRP of the strongest link measured by the IAB-node 204 (e.g., the strongest signal strength received from the backhaul nodes), IAB-node 204 receiving an RSRPmax from the network or an upstream node (e.g., in a configuration in RMSI, OSI, RRC message, other BH signaling, etc., as described, or as configured in the IAB-node 204, RSRPmax received from a centralized entity or other IAB-node and/or corresponding to RSRP of the strongest link measured by another IAB-node, etc.

In one example, the RSRP1 and RSRP2 thresholds can be determined as [RSRPmax-η, RSRPmax] where η can be a fixed value (e.g., received in a configuration from a centralized entity or other IAB-node, or otherwise configured at the IAB-node 204), and/or a function of RSRPmax (e.g. larger RSRPmax may correspond to a larger η). In another example, the RSRP1 and RSRP2 thresholds can be determined as [RSRP(MCS), RSRPmax], where RSRP(MCS) is determined based on the MCS (e.g. the RSRP corresponding to a minimum signal-to-noise ratio (SNR) that can support the given MCS). In this example, signal measuring component 442 can determine the MCS based at least on one of the maximum MCS supported by the IAB-node 204, or the maximum MCS supported by another IAB-node of the associated backhaul link (e.g., having a backhaul link with the node from which the received signal strength is measured). In this example, a function or mapping of MCS and corresponding RSRP may be received in a configuration from a centralized entity or other IAB-node, or otherwise configured at the IAB-node 204. Moreover, in an example, RSRPmax may be determined as a maximum integer value. Similarly, for example, signal measuring component 442 can determine the RSRP threshold(s) based on the maximum MIMO layer supported by the IAB-node(s) (e.g., IAB-node 204 and/or another IAB-node that used the subject backhaul link), maximum BW, maximum TX power, etc. In this example, a function or mapping of maximum MIMO layer supported, maximum BW, maximum TX power, etc. and corresponding RSRP may be received in a configuration from a centralized entity or other IAB-node, or otherwise configured at the IAB-node 204. In another example, the RSRP1 and RSRP2 thresholds can be determined as [RSRP1 (MCS1), RSRP2(MCS2)] with MCS1<=MCS2 being a range of target MCS values to support.

In method 700, at Block 706, at least one backhaul node of the set of potential backhaul nodes to which to connect over the backhaul link can be determined based at least in part on additional information regarding the set of potential backhaul nodes. In an aspect, parameter determining component 444, e.g., in conjunction with processor(s) 412, memory 416, transceiver 402, node selecting component 242, etc., can determine, based at least in part on the additional information regarding the set of potential backhaul nodes, at least one backhaul node of the set of potential backhaul nodes to which to connect over the backhaul link. For example, the additional information can correspond to capabilities/categories and/or other metrics of the IAB-node 204 or the potential backhaul nodes. For example, the additional information may include a highest modulation order supported, higher MIMO layer supported, maximum TX power, largest BW supported, multi-panel capabilities SDM/full-duplex capability, which can be beam/panel-specific, beam-correspondence capability, timing management capabilities, whether the node has an external synchronization source (e.g., global positioning system (GPS)), how many different timing references that the node can support (corresponding to multi-hop timing), whether the node can support both IAB-nodes and UEs or only one category (e.g., relay-only or AN-only or both), a mobility state of the node (fixed or mobile), how many flows or bearers the node can support, etc., of the IAB-node 204 selecting the backhaul node and/or or the set of potential backhaul nodes. In one example, a function or mapping of parameter values and whether to select the backhaul node, or for determining which of multiple backhaul nodes to select given a variety of parameter values, may be received in a configuration from a centralized entity or other IAB-node, or otherwise configured at the IAB-node 204.

In an example, where the additional information pertains to the IAB-node 204, parameter determining component 444 may determine the additional information based on parameters stored or otherwise used by the IAB-node 204. Where the additional information pertains to the one or more backhaul nodes, parameter determining component 444 may receive the additional information from other IAB-nodes, from an IAB-donor, from a centralized entity 502, from one or more other network nodes, etc. In any case, parameter determining component 444 may use the additional information to determine the at least one backhaul node from the set of potential backhaul nodes. For example, parameter determining component 444 may determine a backhaul node from the set that includes desirable or needed values for capability information (e.g., a first encountered backhaul node and/or a backhaul node with a highest RSRP that also includes the desirable or needed values for the capability information), a backhaul node that has capability information satisfying at least a certain number or certain ones of desired values for the capability information, and/or the like.

In another example, the additional information may include metrics that may be used for link selection, such as RSRP, as described above, topological state (e.g., a hop count, a number of parent nodes, a number of children nodes, etc.), a traffic load, supported traffic types (enhanced mobile broadband (eMBB), ultra-reliable-low latency communications (URLLC), etc.), an interference measurement (e.g., signal-to-noise-and-interference ratio (SINR)), a resource management state (e.g. current (semi-statically) allocated resources of candidate parent nodes), etc. of the IAB-node 204 selecting the backhaul node and/or or the set of potential backhaul nodes. For example, for traffic load, the traffic load can be differentiated for different types of traffic (e.g., eMBB can be differentiated from URLLC), as the IAB-node 204 selecting the backhaul node may be concerned with certain traffic type(s). For resource management state, it may be desirable to select a backhaul node with a similar or compatible (as opposed to necessarily a larger) resource management state so as to minimize the change of the existing resource allocation in the subtree rooted at the IAB-node 204. As described with respect to capability information, parameter determining component 444 may use the metrics (e.g., in addition or alternatively to the capability information) to determine the at least one backhaul node from the set of potential backhaul nodes. For example, parameter determining component 444 may determine a backhaul node from the set that includes desirable or needed values for the metrics (e.g., a first encountered backhaul node and/or a backhaul node with a highest RSRP that also includes the desirable or needed values for one or more of the metrics), a backhaul node that has capability information satisfying at least a certain number or certain ones of desired values for the metrics, and/or the like. In one example, parameter determining component 444 may specifically use the resource management state as it can be desired that reselection does not induce a big change of existing resource allocation in the subtree rooted at the IAB-node.

In one example, as described, one or more of the determining blocks 704 and/or 706 (and/or corresponding functions described above) can be performed by an IAB-node 204, by a corresponding upstream IAB-node or IAB-donor, and/or by a centralized entity 502. For example, the IAB-node 204 can receive or determine relevant parameters (e.g., received signal strength, capability information, metrics, etc.) and can determine the at least one backhaul node based on analyzing the relevant parameters, as described above. In another example, IAB-node 204 may forward one or more of the relevant parameters (e.g., received signal strength measured of various backhaul nodes, capability information determined for the IAB-node 204 or backhaul nodes, metrics related to the IAB-node 204 or backhaul nodes, etc.) to the upstream IAB-node, IAB-donor, or the centralized entity 502. In this example, the upstream IAB-node, IAB-donor, or the centralized entity 502, etc. (e.g., via its node selecting component 242) can determine the at least one backhaul node for the IAB-node 204. In this example, the IAB-node 204 can receive an indication of the selected backhaul node from the upstream IAB-node, IAB-donor, or the centralized entity 502. In either case, as described, one or more of the determining blocks 704 and/or 706 can be based on solving an optimization problem, based on criteria such as one or more thresholding metrics, etc., as described above.

In method 700, at Block 708, the at least one backhaul node can be indicated to the access node for attempting connection over the backhaul link. In an aspect, node selecting component 242, e.g., in conjunction with processor(s) 412, memory 416, transceiver 402, node selecting component 242, etc., can indicate, to the access node (e.g., IAB-node 204), the at least one backhaul node for attempting connection over the backhaul link. For example, where node selecting component 242 is part of the IAB-node 204, the node selecting component 242 can indicate the at least one backhaul node to a selection function of the IAB-node 204 for attempting connection to the at least one backhaul node. Where node selecting component 242 is part of an upstream node or centralized entity 502, for example, the node selecting component 242 can indicate the at least one backhaul node by transmitting a corresponding communication to the IAB-node 204. In this example, node selecting component 242 part of an upstream node or centralized entity 502 may indicate the at least one backhaul node based on a request from IAB-node 204, based on receiving a measurement reports or set of potential backhaul nodes from the IAB-node 204, etc.

In method 700, optionally at Block 710, one or more parameters for determining a set of potential backhaul nodes based on received signal strength and/or on additional information can be transmitted. In an aspect, node selecting component 242, e.g., in conjunction with processor(s) 412, memory 416, transceiver 402, node selecting component 242, etc., can transmit the one or more parameters for determining a set of potential backhaul nodes based on received signal strength and/or on additional information. For example, node selecting component 242 can transmit the one or more parameters to one or more other IAB-nodes, an upstream node, a centralized entity 502, etc. For example, node selecting component 242 can transmit measured received signal strength values, thresholds or ranges determined for selecting potential backhaul nodes, capability information or metrics used to select at least one of the potential backhaul nodes, etc., to other IAB-nodes (e.g., or to an upstream node or centralized entity 502 for forwarding to other IAB-nodes). For example, node selecting component 242 can transmit the information via RMSI, OSI, RRC message or other BH signaling, as described.

In method 700, optionally at Block 712, the at least one backhaul node can be connected to over the backhaul link to access the IAB network. In an aspect, node selecting component 242, e.g., in conjunction with processor(s) 412, memory 416, transceiver 402, node selecting component 242, etc., can connect to the at least one backhaul node over the backhaul link to access the IAB network. For example, the IAB-node 204 (e.g., or a UE-F thereof) may perform a random access channel procedure or other procedure to establish a connection with the backhaul node to receive backhaul access to the IAB network. For example, the IAB-node 204 may serve other IAB-nodes or UEs by communicating with the at least one backhaul node to relay communications therebetween.

Figure 8:
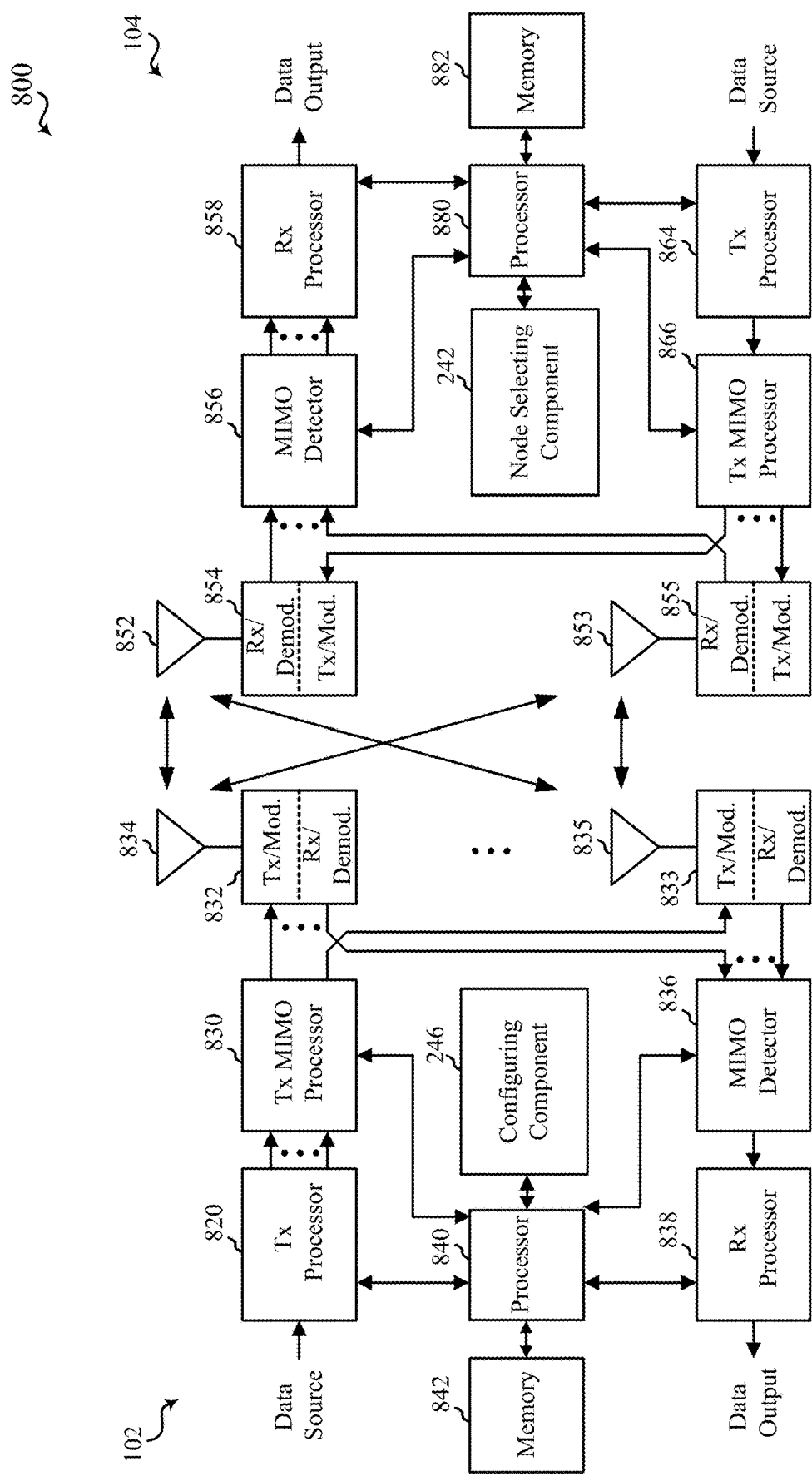
FIG. 8 is a block diagram illustrating an example of a MIMO communication system including a base station and a UE, in accordance with various aspects of the present disclosure.

FIG. 8 is a block diagram of a MIMO communication system 800 including a base station 102 (or an AN-F of an upstream node) and a UE 104 (or a UE-F of an IAB-node 204). The MIMO communication system 800 may illustrate aspects of the wireless communication access network 100 described with reference to FIG. 1. The base station 102 may be an example of aspects of the base station 102 described with reference to FIG. 1. The base station 102 may be equipped with antennas 834 and 835, and the UE 104 may be equipped with antennas 852 and 853. In the MIMO communication system 800, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104 may be an example of aspects of the UEs 104 described with reference to FIGS. 1-2, a UE-F of an IAB-node 204, etc. At the UE 104, the UE antennas 852 and 853 may receive the DL signals from the base station 102 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104 to a data output, and provide decoded control information to a processor 880, or memory 882.

The processor 880 may in some cases execute stored instructions to instantiate a node selecting component 242 (see e.g., FIGS. 2 and 4) for selecting one or more backhaul nodes for connecting to an IAB network.

On the uplink (UL), at the UE 104, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 102 in accordance with the communication parameters received from the base station 102. At the base station 102, the UL signals from the UE 104 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a configuring component 246 (see e.g., FIGS. 2 and 5) for configuring an IAB-node with parameters for selecting one or more backhaul nodes.

The components of the UE 104 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 800.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   determining, based on a received signal strength, a set of potential backhaul nodes for providing a backhaul link in an integrated access and backhaul (IAB) network, wherein determining the set of potential backhaul nodes comprises determining that signal measurements of signals received from the set of potential backhaul nodes are within a range of threshold measurement values, wherein the range of threshold measurement values include a minimum threshold measurement value based on a first modulation and coding scheme (MCS) and a maximum threshold measurement value based on a second MCS;
   determining, based at least in part on additional information regarding the set of potential backhaul nodes, at least one backhaul node of the set of potential backhaul nodes to which to connect over the backhaul link in the IAB network; and
   indicating, to an access node, the at least one backhaul node for attempting connection over the backhaul link.

2. The method of claim 1, wherein the received signal strength includes one or more of reference signal received power, reference signal received quality, or received signal strength indicator.

3. The method of claim 1, further comprising receiving one or more parameters for determining the set of potential backhaul nodes based on the received signal strength.

4. The method of claim 1, wherein the range of threshold measurement values are based on one or more supported multiple-input multiple-output layers, a maximum bandwidth, or a maximum transmit power.

5. The method of claim 1, wherein the range of threshold measurement values includes a maximum signal power measurement that is at least one of measured from a strongest link of the set of potential backhaul nodes or specified in a configuration.

6. The method of claim 5, wherein the range of threshold measurement values also includes a minimum signal power measurement that is a function of the maximum signal power measurement.

7. The method of claim 1, further comprising receiving the signal measurements or the range of threshold measurement values in signaling from one or more access nodes or one or more backhaul nodes.

8. The method of claim 1, wherein the additional information includes, for each backhaul node in the set of potential backhaul nodes, one or more of a highest supported modulation and coding scheme (MCS), a highest multiple-input multiple-output layer supported, a maximum transmit power, a largest supported bandwidth, multi-panel capabilities, beam-correspondence capability, timing management capabilities, whether access nodes and user equipment are supported, a mobility state, or a number of bearers supported.

9. The method of claim 8, further comprising receiving the additional information in signaling from one or more access nodes or one or more backhaul nodes.

10. The method of claim 1, wherein the additional information includes, for each backhaul node in the set of potential backhaul nodes, a topological state, a traffic load, an interference measurement, or a resource management state.

11. The method of claim 10, further comprising receiving the additional information in signaling from one or more access nodes or one or more backhaul nodes.

12. The method of claim 1, further comprising connecting to the at least one backhaul node over the backhaul link to access the IAB network.

13. An apparatus for wireless communication, comprising:
a transceiver;
a memory configured to store instructions; and
one or more processors communicatively coupled with the transceiver and the memory, wherein the one or more processors are configured to:
determine, based on a received signal strength, a set of potential backhaul nodes for providing a backhaul link in an integrated access and backhaul (IAB) network, wherein the one or more processors are configured to determine the set of potential backhaul nodes based at least in part on determining that signal measurements of signals received from the set of potential backhaul nodes are within a range of threshold measurement values;
determine, based at least in part on additional information regarding the set of potential backhaul nodes, at least one backhaul node of the set of potential backhaul nodes to which to connect over the backhaul link in the IAB network; and
indicate the at least one backhaul node for attempting connection over the backhaul link.

14. The apparatus of claim 13, wherein the received signal strength includes one or more of reference signal received power, reference signal received quality, or received signal strength indicator.

15. The apparatus of claim 13, wherein the one or more processors are further configured to receive one or more parameters for determining the set of potential backhaul nodes based on the received signal strength.

16. The apparatus of claim 13, wherein the range of threshold measurement values are based on one or more supported multiple-input multiple-output layers, a maximum bandwidth, or a maximum transmit power.

17. The apparatus of claim 13, wherein the range of threshold measurement values includes a maximum signal power measurement that is at least one of measured from a strongest link of the set of potential backhaul nodes or specified in a configuration.

18. The apparatus of claim 17, wherein the range of threshold measurement values also includes a minimum signal power measurement that is a function of the maximum signal power measurement.

19. The apparatus of claim 13, wherein the one or more processors are further configured to receive the signal measurements or the range of threshold measurement values in signaling from one or more access nodes or one or more backhaul nodes.

20. The apparatus of claim 13, wherein the additional information includes, for each backhaul node in the set of potential backhaul nodes, one or more of a highest supported modulation and coding scheme (MCS), a highest multiple-input multiple-output layer supported, a maximum transmit power, a largest supported bandwidth, multi-panel capabilities, beam-correspondence capability, timing management capabilities, whether access nodes and user equipment are supported, a mobility state, or a number of bearers supported.

21. The apparatus of claim 20, wherein the one or more processors are further configured to receive the additional information in signaling from one or more access nodes or one or more backhaul nodes.

22. The apparatus of claim 13, wherein the additional information includes, for each backhaul node in the set of potential backhaul nodes, a topological state, a traffic load, an interference measurement, or a resource management state.

23. The apparatus of claim 22, wherein the one or more processors are further configured to receive the additional information in signaling from one or more access nodes or one or more backhaul nodes.

24. The apparatus of claim 13, wherein the one or more processors are further configured to connect to the at least one backhaul node over the backhaul link to access the IAB network.

25. An apparatus for wireless communication, comprising:
means for determining, based on a received signal strength, a set of potential backhaul nodes for providing a backhaul link in an integrated access and backhaul (IAB) network, wherein the means for determining the set of potential backhaul nodes comprises means for determining that signal measurements of signals received from the set of potential backhaul nodes are within a range of threshold measurement values, wherein the range of threshold measurement values include a minimum threshold measurement value based on a first modulation and coding scheme (MCS) and a maximum threshold measurement value based on a second MCS;
means for determining, based at least in part on additional information regarding the set of potential backhaul nodes, at least one backhaul node of the set of potential backhaul nodes to which to connect over the backhaul link in the IAB network; and means for indicating, to an access node, the at least one backhaul node for attempting connection over the backhaul link.

26. The apparatus of claim 25, wherein the received signal strength includes one or more of reference signal received power, reference signal received quality, or received signal strength indicator.

27. The apparatus of claim 25, further comprising means for receiving one or more parameters for determining the set of potential backhaul nodes based on the received signal strength.

28. The apparatus of claim 25, wherein the additional information includes, for each backhaul node in the set of potential backhaul nodes, one or more of a highest supported modulation and coding scheme (MCS), a highest multiple-input multiple-output layer supported, a maximum transmit power, a largest supported bandwidth, multi-panel capabilities, beam-correspondence capability, timing management capabilities, whether access nodes and user equipment are supported, a mobility state, or a number of bearers supported.

29. The apparatus of claim 25, wherein the additional information includes, for each backhaul node in the set of potential backhaul nodes, a topological state, a traffic load, an interference measurement, or a resource management state.

30. The apparatus of claim 25, further comprising means for connecting to the at least one backhaul node over the backhaul link to access the IAB network.

31. A non-transitory computer-readable medium, comprising code executable by one or more processors for wireless communications, the code comprising code for:
determining, based on a received signal strength, a set of potential backhaul nodes for providing a backhaul link in an integrated access and backhaul (IAB) network, wherein the code for determining the set of potential backhaul nodes comprises code for determining that signal measurements of signals received from the set of potential backhaul nodes are within a range of threshold measurement values, wherein the range of threshold measurement values include a minimum threshold measurement value based on a first modulation and coding scheme (MCS) and a maximum threshold measurement value based on a second MCS;
determining, based at least in part on additional information regarding the set of potential backhaul nodes, at least one backhaul node of the set of potential backhaul nodes to which to connect over the backhaul link in the IAB network; and
indicating, to an access node, the at least one backhaul node for attempting connection over the backhaul link.

32. The non-transitory computer-readable medium of claim 31, wherein the received signal strength includes one or more of reference signal received power, reference signal received quality, or received signal strength indicator.

33. The non-transitory computer-readable medium of claim 31, further comprising code for receiving one or more parameters for determining the set of potential backhaul nodes based on the received signal strength.

34. The non-transitory computer-readable medium of claim 31, wherein the additional information includes, for each backhaul node in the set of potential backhaul nodes, one or more of a highest supported modulation and coding scheme (MCS), a highest multiple-input multiple-output layer supported, a maximum transmit power, a largest supported bandwidth, multi-panel capabilities, beam-correspondence capability, timing management capabilities, whether access nodes and user equipment are supported, a mobility state, or a number of bearers supported.

35. The non-transitory computer-readable medium of claim 31, wherein the additional information includes, for each backhaul node in the set of potential backhaul nodes, a topological state, a traffic load, an interference measurement, or a resource management state.

36. The non-transitory computer-readable medium of claim 31, further comprising code for connecting to the at least one backhaul node over the backhaul link to access the IAB network.

* * * * *